Aug. 14, 1956 W. J. COTTON 2,758,475
INDICATING EQUIPMENT FOR CHEMICAL PROCESS
Original Filed Oct. 8, 1949 6 Sheets-Sheet 1

INVENTOR.
WILLIAM J. COTTON
BY
Miles Henninger
ATTORNEY

Aug. 14, 1956 W. J. COTTON 2,758,475
INDICATING EQUIPMENT FOR CHEMICAL PROCESS
Original Filed Oct. 8, 1949 6 Sheets-Sheet 2

INVENTOR.
WILLIAM J. COTTON
BY
*Miles Henninger*
ATTORNEY

INVENTOR.
WILLIAM J. COTTON
BY
Miles Henninger
ATTORNEY

Aug. 14, 1956  W. J. COTTON  2,758,475
INDICATING EQUIPMENT FOR CHEMICAL PROCESS
Original Filed Oct. 8, 1949  6 Sheets-Sheet 4

INVENTOR.
WILLIAM J. COTTON
BY
ATTORNEY

Aug. 14, 1956 W. J. COTTON 2,758,475
INDICATING EQUIPMENT FOR CHEMICAL PROCESS
Original Filed Oct. 8, 1949 6 Sheets-Sheet 5

INVENTOR.
WILLIAM J. COTTON
BY
Miles Henninger
ATTORNEY

United States Patent Office 2,758,475
Patented Aug. 14, 1956

2,758,475

INDICATING EQUIPMENT FOR CHEMICAL PROCESS

William J. Cotton, Milwaukee, Wis.

Continuation of application Serial No. 136,128, December 30, 1949, which is a division of application Serial No. 120,380, October 8, 1949. This application August 11, 1952, Serial No. 303,779

3 Claims. (Cl. 73—339)

This invention relates to the control of chemical processes by integrating the temperature and time thereof to produce optimum yield and uniform quality of the product, by processing to exactly the desired degree and neither under-processing nor over-processing.

It is well known in normal plant operations that actual operating temperatures deviate from standard processing temperatures, both above and below the set standard, for indefinite times during the process. From an operating standpoint such fluctuations are unavoidable even with the most skillful labor available. In most cases the aim is to produce the theoretical yield or maximum conversion of the raw materials or reactants into the finished product. However, in some cases standards have been established by usage in the trade so that product desired by trade is either normally over-processed or under-processed as compared with the theoretically best processing.

This invention provides a substantially continuous automatic correction in processing time dependent on the fluctuating temperature of the particular batch, that is, correction in time of processing to offset deviations from normal, or ideal standard processing temperature. The correction is based on the extent and duration of temperature deviation, and utilizes the temperature cofficient of the rate of reaction, which factors are mechanically integrated as time-temperature units. The changes, deviations or fluctuations in the temperature of operation are recorded by a mechanical device indicating the accumulated time-temperature units (T-T units). An experimentally predetermined total of T-T units for each reaction is the endpoint of the reaction regardless of the time factor, if maximum yield and desired quality is to be obtained.

It is well known that increase in temperature generally increases the rate of reaction and sometimes, as is the case in most reactions carried out in aqueous media, the reaction rate in general doubles for each rise of approximately 10° C. In the case of caustic soda fusions, the rate of reaction may double with every 5° C. rise in temperature. In other words, temperatures below normal for a given reaction, result in decreasing the rate of reaction. Thus, a drop of 10° C. in the temperatures at which an aqueous reaction is carried out will frequently result in reducing the rate of reaction by half, while caustic soda fusion reactions are quartered by a drop of 10° C. The change in rate of reaction with change in temperature at which the reaction is conducted, is defined as the temperature coefficient of the reaction. For the purposes of this invention, the temperature coefficient is measured in terms of degrees centigrade rise in temperature which will double the rate at which the reaction proceeds.

It is obvious that the greater the temperature coefficient, that is the fewer degrees temperature rise required to double the rate of reaction, the greater the importance of and the need for minimizing deviations of even a degree of temperature, or alternatively to correct the time of processing in accordance with this invention. It is also obvious that the greater the diffculty of controlling the temperature of the process as a result of varying steam pressure in a kettle jacket or varying pressure to the gas or oil burner under a kettle, the more important an immediate correction in processing time becomes.

The control equipment for application to any given reaction, while embodying the general principles of this invention, is easily adapted to any specific reaction to be performed. To adjust the constants of the control equipment to the reaction to be controlled, it is desirable but not essential that at least three and preferably all four, of the following conditions be experimentally determined in advance; namely, (a) The threshold temperature which is the temperature at which the reaction will begin and progress at a low rate such as 1% per hour;

(b) The temperature coefficient for the rate of reaction desired which is expressed in the number of degrees rise in temperature, in centigrade degrees, required to double the rate of reaction;

(c) A good normal or the ideal operating temperature permitting completion of the reaction of a batch to the desired extent in a convenient or practical length of time; and (d) The total number of energy units (time-temperature units) to be put into the batch for obtaining the desired degree of processing.

The present invention can be applied advantageously in many cases without previously determining any or all of the above data in connection with a specific reaction. Thus the control equipment can be applied to a batch operation in an existing process and the process run as usual for several batches, during which time the varying number of T-T units of energy supplied to the batch can be co-related to the yield and quality of the product. The desirable or the optimum number of energy T-T units utilized can be thus determined. Thereafter the control equipment can be set to indicate when the desired number of energy units have been supplied, by any appropriate means, such as a counter device, a light or bell, or other signal, or, all of them. The control equipment may operate a valve to turn off steam to the kettle jacket or gas or oil to the burner or to shut off electrical heating power.

In the case of a mechanical equipment, such as is illustrated in Figs. 1 through 10 thereof, only the master or main gear ratios need to be changed to adapt the control equipment to a given process by matching the temperature coefficient of the rate of reaction thereof; to select the proper range for the temperature indicator which preferably includes the threshold temperature at which the reaction begins and the maximum permissible operating temperature; to select the secondary gear ratios to indicate the increments of energy units that have been supplied, corresponding to the fluctuating temperature as time progresses, and to adjust the totaling device in such manner that the energy increments for which the secondary gears are adjusted, are related to the temperature coefficient adjustment or selection of the master gear ratio.

It is therefore an object of the present invention to provide both time controlled equipment for and a method for adapting such equipment to any chemical reaction.

Another object of the invention is to provide equipment for controlling the duration of chemical reactions dependent on the heat involved, regardless of whether the reaction is endothermic or exothermic.

Another object of the invention is to provide a machine for automatically controlling the duration of a chemical reaction in which the temperature steps to be employed may be made uniform or of unequal values as desired.

Another object of the invention is to provide equipment for controlling chemical reactions in which the application of heat or the removal of heat may be automatically controlled and in which an indication is given both of the status of the reaction at any given time and of the time when the endpoint of the reaction is reached.

Another object of the invention is to provide a method for readily determining the settings of various elements of a control equipment used for controlling the duration of chemical reactions whereby the equipment may be readily adjusted and transferred from one reaction to another.

Another object of the invention is to provide equipment for readily determining the number of time-temperature (T-T) energy units required in processing any given material by the use of heat and determining the manner in which such units should be applied whereby the process may thereafter be controlled to optimum conditions with the minimum of labor or chance for error.

And a further object of the invention is to provide control equipment by which either a batch may be dumped or the reaction otherwise terminated when the predetermined number of energy units have been applied or an alarm may be operated to notify an operator that a reaction is to be terminated by means requiring the intervention of the operator.

Objects and advantages other than those above set forth, will be apparent from the following description when read in connection with the accompanying drawings in which.

Referring to the drawing by numerals, like numerals refer to like parts with a letter A, B, C, to designate like parts of a plurality of similar systems contained within the control. Only three systems are shown in the first embodiment of the invention as only the first system A, one intermediate system B and the final system C are needed to explain operation thereof.

The control is mounted in and on a cabinet or casing 1 of any suitable material. An opening in one end of the cabinet admits an extension cord 2 containing a main switch 3 for controlling the supply of electrical power for driving the mechanical portions of the present embodiment of the control, as will be described. Bus bars 4, 5 (see Fig. 6) distribute electric current to the several systems in the control. An opening in the rear wall of the cabinet allows entry for a mercury tube, a gas-filled tube, thermocouple leads or other means connecting a temperature responsive element (not shown), inserted into the thermometer well of a kettle or vat (not shown) and in which the reaction is to be carried out. The internal end of the connecting means is attached to and actuates an indicator 8 (see Figs. 3 and 4). One end of indicator or pointer 8 carries a permanent magnet 9 which is counter-balanced by weight 10 on the other pointer end. The cabinet is provided with an intermediate or mezzanine floor 11 on which is mounted a vertical internal panel 12.

A counting device 13 is mounted on the vertical panel 12 and the figures thereof can be read through a window 14 in the front wall of the cabinet. The counter 13 is actuated through a link 15 pivoted to a lever 16 which is pivoted on the cabinet base and lever 16 is actuated by a crank 17 acting against the pressure of a spring 18 (see Figs. 7 and 8). Thus, spring 18 urges lever 16 to the position shown in Fig. 2 and rotation of crank 17 brings the end thereof against lever 16 to pivot the lever counterclockwise from the Fig. 2 position.

A red lens 22 is mounted in the front of the cabinet with a light 23 behind the lens to indicate when the main switch 3 is closed to supply electric power to a motor 24 (see Figs. 5 and 6) and to other parts of the control. The motor is preferably of the type with built-in speed reducing gearing indicated at 25 and drives a gear 26 meshing with a gear 27, which gears are herein called master or main gears. Gears 26, 27 are speed reducing and form a power transmission of which the ratio can be easily changed. Gear 27 is fixed on a shaft 30 extending longitudinally of the cabinet and parallel with shafts 31, 32 and 33. The four shafts are common to each of a plurality of gear trains which are severally parts of control systems designated A, B and C, all of which systems are in the cabinet and which have some other common parts.

Each system includes a gear train comprising gears 34, 35, 36 and 37 of which gear 34 is fixed to shaft 30, while gears 35, 36 and 37 are severally mounted on shafts 31, 32 and 33 in freely rotatable relation thereon. Gears 34 drive gears 35 and 36 but gears 37 are driven only upon engagement of one of clutches 40 of each system and which are especially shown in Figs. 7 and 8. It will be noted that each of gears 35 and 36 is actually two gears of different size in which power is received by the smaller portion and power is delivered by the larger portion thus producing a large speed reduction in each gear train. The several trains or sets of gears 34–37 are of different ratio so that the several gear trains drive the final or output shaft 33 at double the speed of the preceding gear train. Thus it is possible to obtain an output speed proportional to the rate of reaction multiplied by time, for each doubling (or halving) of reaction rate. The speed of shaft 33 and crank 17 is thus doubled upon each shifting from one shaft to the next higher shaft, i. e., the R. P. M. of shaft 33 doubles when clutch 40A is disengaged and clutch 40B is engaged and so on to final system C. An overall change in speed is obtained by changing the master or main gears 26, 27 to a different ratio and without affecting the relationships of the trains of gears and such ratio change is used to adapt the control to different temperatures at which the rate of reaction doubles or is halved.

The shaft 33 has crank 17 fixed thereto and has a sleeve which may be connected to the shaft by any one of clutches 40 severally forming a part of each system. The clutches generally designated 40, severally comprise a jaw plate 41 connected with a gear 37 and a jaw plate 42 splined on shaft 33. The plate 42 has pins 43 extending into slots in a yoke 44 pivoted on the base. The clutch yokes are pivoted at 45 on the cabinet base and are pivotally connected with bell-crank 46 which is itself pivoted at 47 on the intermediate cabinet floor 11. Each clutch jaw 42 is thus urged toward the position for disengagement from clutch jaw 41 by the action of a spring 48 on one end of the bell-crank.

Figure 7:
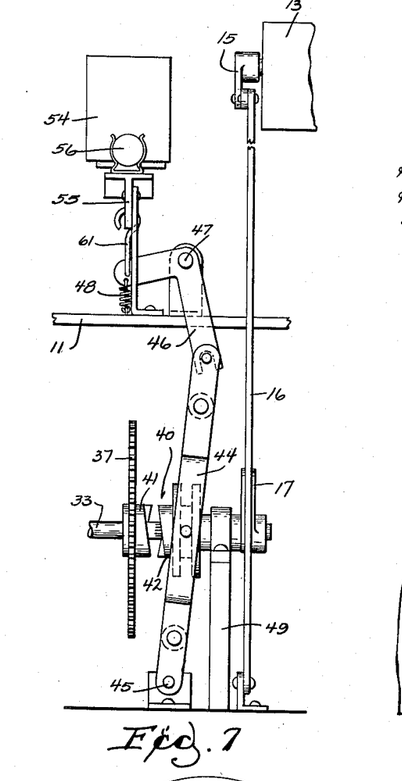
Fig. 7 is an enlarged side elevation of a fragment of the gear train, its clutch and of the clutch-operating means and a fragment of the totaling counter and its operating means.

Each of the systems also includes a solenoid 54 (see Fig. 6) mounted on the panel 12 and which severally actuate clutches 40 for engaging crank 17 with the shaft 33. The armature of the solenoid is pivotally connected with a pivoted lever 55 on which is mounted a double-acting mercury switch 56 capable of assuming two positions to connect either conductors 57, 58 or 59, 60. The lever 55 is connected by a hook 61 with bell-crank lever 46 mounted on the intermediate floor 11 and the bell-crank and clutch yoke are thus under the tension of spring 48. Thus clutch jaw 42 is moved into engagement with clutch jaw 41 fixed on gear 37, whenever solenoid 54 is energized. When solenoid 54 is de-energized, spring 48 acts on bell-crank 46 to tilt yoke 44 to the position for disengaging the clutch jaws as shown in Fig. 7.

The several systems include a signalling device such as a light 65 located behind a green lens 66 in the cabinet front wall. The lights are individually energized when the system including a given light is in operation and no two green lights are on at the same time.

Each of the systems also includes a relay 67 (see Fig. 18) and a single-acting switch 68 which is provided with means such as a bar magnet coacting with the magnet 9 on the temperature indicating pointer 8. It will be noted (see Fig. 4) that the switches 68 are mounted about an arc described by the end of the pointer 8 as it oscillates on its pivot. The pointer magnet 9 may thus draw successive switch 68 from their normal position at which the contacts are open, to the position for closing the circuits. Switches 68 are thus closed responsive to movement of the temperature sensing device and are so placed that a first switch 72 is at the position reached by the pointer at reaction starting or threshold temperature and is closely followed by switch 68 for the initial system A. The switch 68C for the final system C is at a position corresponding to the highest temperature normally reached by the reaction. Any desired number of intermediate systems B, etc. and intermediate switches are used dependent on whether the reaction doubles (or halves) at 5° C. or 10° C., change in temperature of reaction or at some other value. To determine the number of systems A, B, C, etc. the temperature range between the threshold temperature and the highest temperature which the reaction will normally reach, is divided by a temperature interval equal to that within which the rate of reaction will be either doubled or halved. However, only a single intermediate system B is shown herein for simpler description of the operating cycle.

When power is being supplied, light 23 and motor 24 are energized and the motor drives main transmission 26, 27 and each of the gear trains except gears 37. First or initial system A is put into operation by pointer magnet 9 when it moves to a position opposite the magnet switch 68A to attract and tilt the switch into closed position. Solenoid 54A is then energized to raise its lever 55 and its bell-crank lever 46 to move its clutch yoke 44 from the position for disengaging clutch jaws 41, 42 to the position for engaging such jaws, against tension of the spring 48. The gear 37A is then revolved by gear train 34A, 35A, 36A to rotate shaft 33 and actuate crank 17 and leverage 15, 16 and counter 13. Raising of lever 55 also tilts switch 56 to break the circuit of conductors 59, 60. Conductors 57, 58 are then bridged to energize one of the lights 65 and a circuit is closed to one of the relays 67. Relay 67 acts to keep lamp 65 energized until interruption of a circuit to the preceding solenoid 54.

Figure 18:
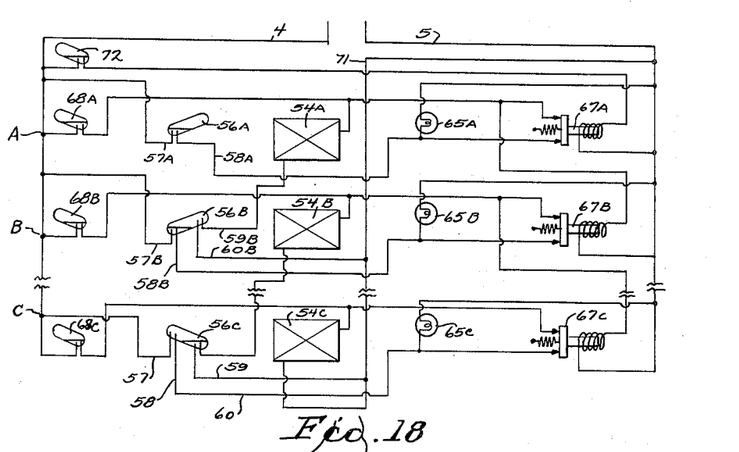
Fig. 18 is a circuit diagram for the first embodiment of the invention.

Referring now to the wiring diagram shown in Fig. 18, all the systems of which only A, B and C are shown, are connected between the bus bars 4, 5 directly or by way of line 71. It will be noted that all of the circuits are identical except that switch 72 is in series with the coil of relay 67A, whereas, the other relays do not have a switch in series with their coils. Further, solenoid 54C is directly connected with line 71 rather than through a switch as is the case with the other solenoids. It will be noted also that switch 56A is only single acting in that it can complete circuits only to its conductors 57, 58 and that a separate switch 72 is provided to act in lieu of the second set of contacts for switch 56A.

Figure 8:
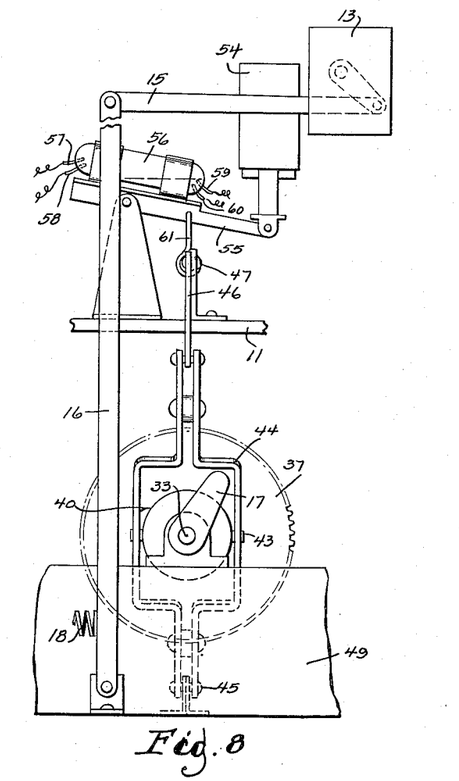
Fig. 8 is an end elevation view of Fig. 7.

Assuming that main switch 3 is closed to supply current to light 22 and motor 24, that relays 67 are closed while solenoids 54 are in the position of Figs. 7 and 8 to close circuits to conductors 59, 60 and that the temperature of the reaction is such that pointer magnet 9 is only approaching switch 68A, but that switch 56A closes a circuit from busbar 4 through switch 56A (conductors 57A, 58A) and lamp 65A to busbar 5. Switch 72 is then open so that the coil of relay 67A is de-energized and the contacts thereof are closed by the relay spring. When pointer magnet 9 closes switch 68A, a circuit is also closed by way of relay 67A to lamp 65A to avoid lamp "flicker."

As the reaction temperature rises, the pointer magnet 9 closes switch 68B to energize solenoid 54B. Switch 56B is then swung to close the circuit of conductors 57B, 58B to lamp 65B, busbar 5 and by way of the contacts of relay 67B to busbar 5. Spring 48A then disengages clutch 40B. When pointer magnet 9 allows switch 68B to open, the circuit to solenoid B is interrupted and switch 56B returns to its original position bridging conductors 59B, 60B whereupon lamp 65B is extinguished.

Further rise in temperature successively closes other switches 68 and completes circuits similar to those described above. Successive closing of switches 68 completes successive energization of the several solenoids 54 and also causes tilting of the respective switches 56 for breaking the circuits through the next preceding solenoid 54. When final system C is reached and switch 68C is closed, current flows directly through solenoid 54C to line 71 and busbar 5. It will be noted that switch 72 is similar to switches 58 and is the first of such switches closed on rising temperature or the last switch opened on decreasing temperature.

When the temperature decreases, the pointer magnet 9 moves counter-clockwise. Assuming that the temperature is such that the magnet moves from switch 68C to switch 68B and closes such switch, solenoid 54C is energized and current flows by way of conductors 57B, 58B through the contacts of relay 67B. The contacts of relay 67B are then opened to interrupt the circuit through solenoid 54C and allow disengagement of clutch 40C. Solenoid 54B then tilts switch 56B to reconnect conductors 59B, 60B.

So long as the temperature drops, the systems are successively put into operation in reverse alphabetical order until switch 72 is closed whereupon relay 67A is energized to open its contacts and solenoid 54A is de-energized to tilt switch 56A to its initial position and to allow clutch 40A to open for disconnecting gears 37 and shaft 33.

Figure 1:
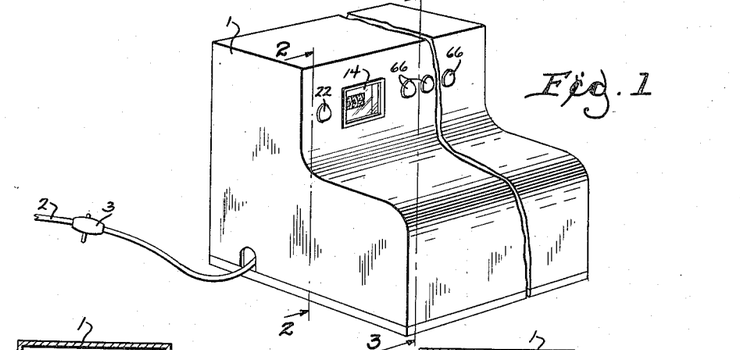
Fig. 1 is a perspective view of one control equipment embodying the present invention.
Figure 2:
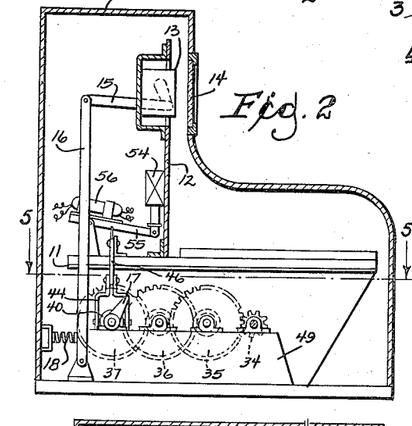
Fig. 2 is a vertical sectional view on the line 2—2 of Fig. 1.
Figure 3:
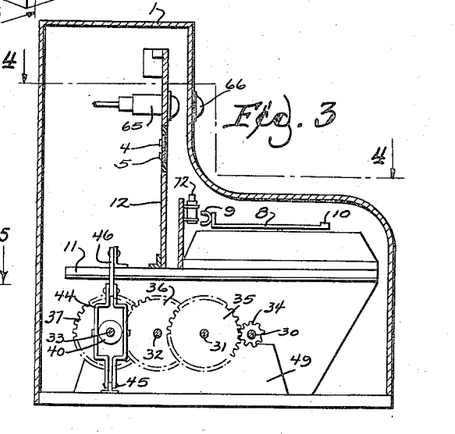
Fig. 3 is a vertical sectional view of the line 3—3 of Fig. 1.
Figure 4:
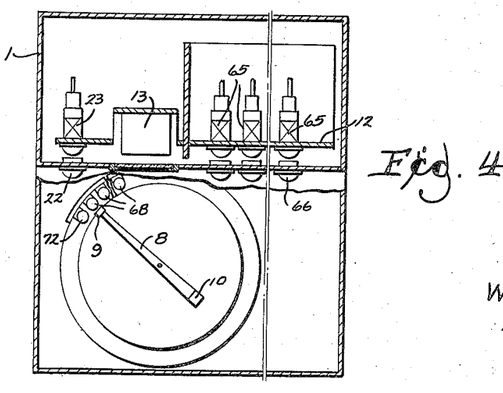
Fig. 4 is a sectional view on the broken line 4—4 of Fig. 3.
Figure 5:
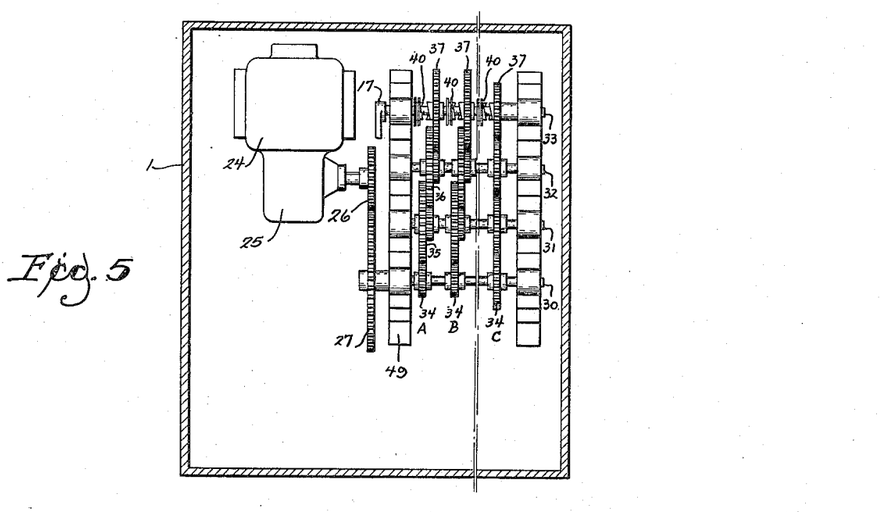
Fig. 5 is a horizontal sectional view on the line 5—5 of Fig. 2.
Figure 6:
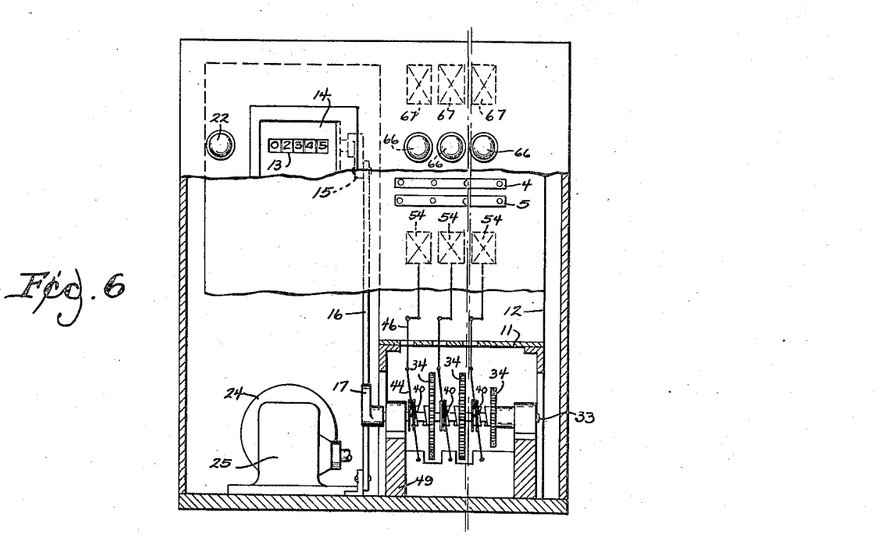
Fig. 6 is a somewhat diagrammatic elevational view looking into the cabinet from the front thereof.
Figure 9:
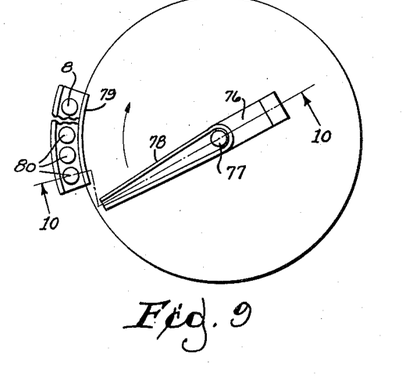
Fig. 9 is a top plan view of a modification of the temperature sensing device.
Figure 10:
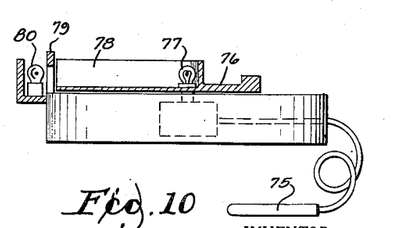
Fig. 10 is a vertical section on the line 10—10 of Fig. 9.
Figure 11:
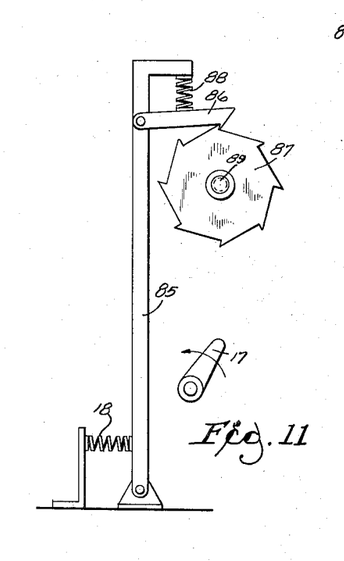
Fig. 11 is a side elevation of a modification of the means for operating a counter and for giving continuous indication of the action in the process.

Figs. 9 and 10 illustrate a modification of the thermally-responsive switching-operating means of Figs. 2 and 3. A temperature sensitive device 75 has a pointer 76. A lamp 77 is mounted at the pivot for pointer 76 and withing a radially extending shield 78 on the pointer for directing light rays from the lamp along the pointer and through holes in a partial wall 79 on device 75. A series of photo-sensitive cells 80 are positioned opposite the holes in the wall 79 and act severally in lieu of switches 68 of the first embodiment. As pointer 76 swings clockwise upon temperature increase (in the direction of arrow), circuits are closed in the several systems through photo-cells 80, solenoids 54, switches 56, lamps 65 and relays 67, in succession as above described.

Figure 12:
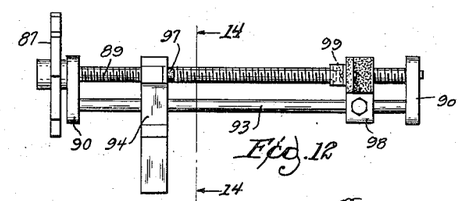
Fig. 12 is a top plan view of the modification in Fig. 11.
Figure 13:
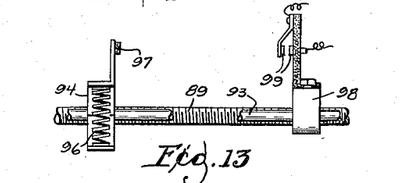
Fig. 13 is a fragmentary side elevation of the structure of Fig. 12.
Figure 14:
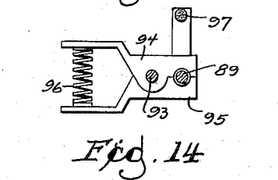
Fig. 14 is a side elevation of a portion of the structure of Fig. 13.
Figure 15:
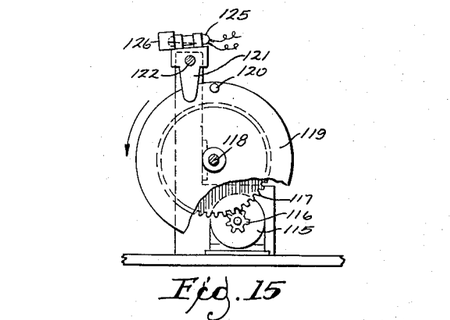
Fig. 15 is an end view with portions broken away of a modified sub-combination for operating certain switches in the device.
Figure 16:
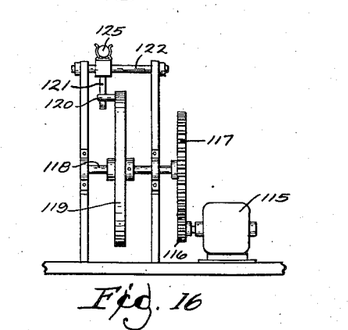
Fig. 16 is a side elevation of the structure shown in Fig. 15.
Figure 17:
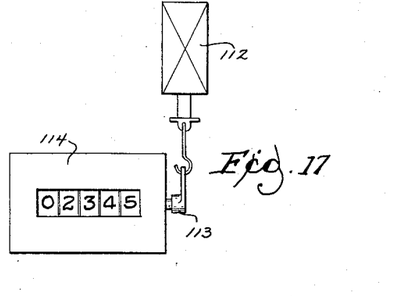
Fig. 17 is a somewhat diagrammatic view of a modified structure for operating a counter.

Figs. 12 to 14 illustrate a counter using a pointer traveling along a screw rather than the rocking shaft counter of the first embodiment, and also illustrate electrical circuit contacts for automatically signalling, audibly or visibly, the endpoint of the reaction, for stopping the reaction or for dumping a batch. The present device employs gear train shaft 33 and crank 17 operable thereby. A counter-operating lever 85 is pivoted on the cabinet base and has a pawl 86 pivoted thereon to be urged against a ratchet wheel 87 by a spring 88, the ratchet wheel being keyed to a horizontal screw 89 connected with the shaft of the counting device. Pawl 86 revolves ratchet wheel 87 in steps of an angle equal to 360° divided by the number of ratchet teeth each time crank 17 bears on lever 85 to swing the lever counter-clockwise. After crank 17 releases lever 85, the lever is brought to the original position by spring 18 and the pawl engages the next tooth of the ratchet wheel.

Screw 89, with a definite number of threads per unit of length, e. g., thirty-two threads to the inch, is rotatably supported by blocks 90. A horizontal guide rod 93 is mounted between the blocks 90 and has a nut sliding thereon and formed with threads to engage the screw. The nut is formed in two parts 94, 95 which are somewhat in the form of the jaws of pliers and the parts are severally pivoted on guide rod 93. The internally threaded nut portions of the nut parts 94, 95 are pressed together by spring 96, which thus provides a nut which may be released from the screw and reset thereon wherever desired. The nut has an insulating pad 97 mounted on one of the nut parts to provide a simple way by which the nut can be used to close a switch. When the nut is to be reset, the handles on the nut halves 94, 95 are pressed together against the force of spring 96 to disengage the nut from the screw. The nut can then be slid along guide rod 93 to the point desired for the beginning of another movement.

When the present device is in use, turning of ratchet wheel 87 and screw 89 causes nut 94, 95 to travel longitudinally along the screw and guide rod toward right-hand block 90. Progress of the nut is indicated by the bar with pad 97. Prior experience determines completion of a reaction in terms of T-T units and a stop 98 is fixed on the screw at the predetermined location.

When the present device is to operate automatically, pad 97 on the nut closes a switch 99 on the stop. The circuit controlled by switch 99 may activate a signal, or operate a solenoid to cut off the supply of heat or may dump the treating kettle.

Figure 19:
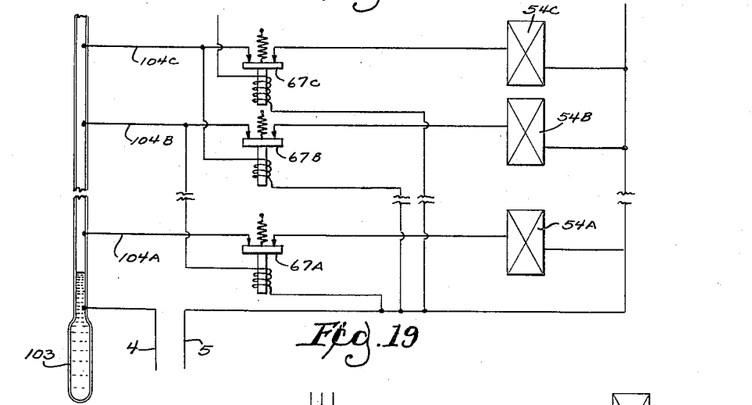
Fig. 19 is a circuit diagram for a modified form of the invention.

If a mercury thermometer arrangement is used in making and breaking the circuits through solenoids 54 instead of the thermally-responsive device 8 and the switches 56, 68 and 72 of Figs. 1 to 9, the arrangement of parts and the associated apparatus may be simplified. Fig. 19 shows a mercury-bulb type of thermometer 103 with its bulb connected with busbar 4. Electric conductors 104 with contact points of metal resistive to the action of mercury, are inserted into the thermometer tube to make successive contact with the mercury column as the mercury rises in the stem. Each of the conductors 104 is part of a separate system, such as described above, and only the initial system A, one intermediate system B and the final system C, are shown.

As the mercury rises in the thermometer stem upon increase of temperature in the kettle, the mercury first reaches conductor 104A to close a circuit through the contacts of relay 67A and through the first solenoid 54A to the busbar 5. Thereupon the first clutch 40A is engaged to drive shaft 33 at its lowest speed. At further increase in temperature, a circuit is completed through conductor 104B and the contacts of relay 67B and through the next solenoid 54B. Current also flows through the coil of relay 67A to open such relay thus de-energizing the first solenoid 54 and allowing its associated clutch to be disengaged by the clutch spring. The gear train associated with the second solenoid 54B then causes shaft 33 to be driven at its next higher speed. The coil of relay 67C is connected with busbar 5 to complete the circuits and system C acts in the same way as system B. As many additional relays and solenoids may be provided as are desired to provide a desired number of steps in a control equipment.

In moving down the temperature scale, when the mercury column falls below conductor 104C, relay 67C having previously been opened, the circuit through the coil of relay 67B will be broken to allow closing the relay contacts by its spring. The circuit through conductor 104B and contacts of relay 67B will be maintained until the mercury falls below conductor 104B. When the mercury column drops below conductor 104A, the contacts of relay 67A are released by interruption of current to the coil of relay 67A so that the current flows through conductor 104A and the contacts of relay 67A to maintain solenoids 54A in energized condition.

Figs. 15, 16, 17 and 20 diagrammatically represent a control which avoids the secondary trains of gearing and clutch arrangements heretofore described.

A mercury thermometer 106 is connected to busbar 4 and has conductors 107, 108, 109 connected at spaced locations with the thermometer stem whereby the mercury column of the thermometer, through mercury switches and relays, selectively and periodically complete a circuit through a solenoid 112 operating a crank 113 of a counter 114. An electrical motor 115 is now used in each system to operate a mercury switch for controlling the several systems in coaction with relays 67. Each motor 115 (see Figs. 15 and 16) drives gears 116, 117 connected with a shaft 118 which carries a disk 119 having a pin 120 extending therefrom to rock a lever 121 on its pivot 122 upon each revolution of the disk. A mercury switch 125 (Figs. 15 and 16) has a counter-weight 126 on lever 121 to open the switch unless some force is applied thereto, and the switch is closed upon each revolution of disk 119 to break a circuit including one of the conductors 107A, 107B or 107C. All of the motors operate during the time the control is in use to close the switches periodically. However, no circuit is completed until the thermometer mercury reaches one of conductors 107A, 107B or 107C.

Figure 20:
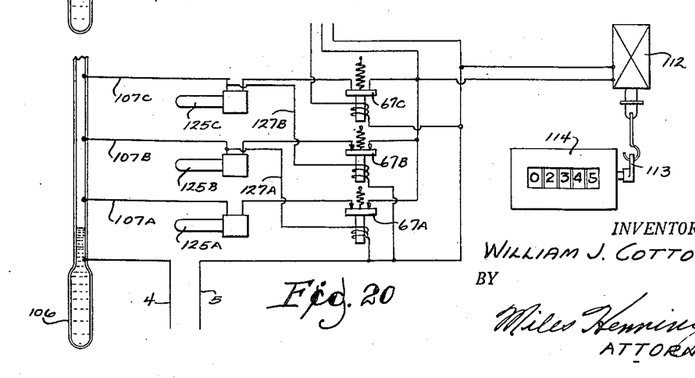
Fig. 20 is a circuit diagram of a second modified form of the invention.

The motors 115 give a number of impulses to the solenoid 112 in a given time and the counter 114 operates to bring into view a number of digits. When the thermometer mercury reaches conductor 107A, mercury switch 125A is closed to connect the contacts of relay 67A with solenoid 112 and thence to busbar 5. When the mercury rises to conductor 107B, mercury switch 125B is closed by motor 115B to complete a circuit through the contacts of relay 67B to solenoid 112. At the same time, a circuit is completed through conductor 127B and the coil of relay 67A to busbar 5 to open relay 67A and make switch 125A ineffective to energize solenoid 112 even though motor 115A continues to actuate switch 125A. Flow of current through the contacts of relay 67B results in periodic actuation of the counter 114 and at a higher rate of speed than when relay 67A was closed. Such increased speed may be simply because of a faster motor or by use of several studs on disk 119B of motor 115B having the same speed as motor 115A.

When the mercury rises to conductor 107C and switch 125C is being periodically tilted by motor 115C, a circuit is completed through contacts of relay 67C to solenoid 112 for operating counter 114 at an even faster rate. At this time relay 67B is energized by way of conductor 127B to open its contacts. Similarly, when a mercury switch connected at 107C on the thermometer is put in operation, the coil of a relay 67C is energized to open its contacts. A single motor can be employed for operating several switches by way of a single stud on one side of a disk to operate a mercury switch at a lower temperature and another stud on the other side of the disk to operate the mercury switch at the next higher temperature. More than one disk might also be placed on a single motor shaft, the disks having different numbers of studs for operating successive switches at different rates.

Typical charts heretofore used manually for similar work are shown as Table I, Table II, Table III and Table IV.

TABLE I

*Basis reaction rate doubling every 5° C. rise in temperature*

[Applicable to anhydrous caustic fusions such as fusion of sodium benzene monosulfonate to sodium phenate where the threshold temperature is 300° C. and a good operating temperature is 320° C.]

| Temp. | T-T Units | Temp. | T-T Units |
|---|---|---|---|
| 300 | 0.06 | 331 | 4.80 |
| 301 | 0.07 | 332 | 5.60 |
| 302 | 0.08 | 333 | 6.40 |
| 303 | 0.10 | 334 | 7.20 |
| 304 | 0.11 | 335 | 8.00 |
| 305 | 0.12 | 336 | 9.60 |
| 306 | 0.14 | 337 | 11.20 |
| 307 | 0.17 | 338 | 12.80 |
| 308 | 0.20 | 339 | 14.40 |
| 309 | 0.23 | 340 | 16.00 |
| 310 | 0.25 | 341 | 19.20 |
| 311 | 0.30 | 342 | 22.40 |
| 312 | 0.35 | 343 | 25.60 |
| 313 | 0.40 | 344 | 28.80 |
| 314 | 0.45 | 345 | 32.00 |
| 315 | 0.50 | 346 | 38.40 |
| 316 | 0.60 | 347 | 44.80 |
| 317 | 0.70 | 348 | 51.20 |
| 318 | 0.80 | 349 | 57.60 |
| 319 | 0.90 | 350 | 64.00 |
| 320 | 1.00 | 351 | 76.80 |
| 321 | 1.20 | 352 | 89.60 |
| 322 | 1.40 | 353 | 102.40 |
| 323 | 1.60 | 354 | 115.20 |
| 324 | 1.80 | 355 | 128.00 |
| 325 | 2.00 | 356 | 153.60 |
| 326 | 2.40 | 357 | 179.20 |
| 327 | 2.80 | 358 | 204.80 |
| 328 | 3.20 | 359 | 230.40 |
| 329 | 3.60 | 360 | 256.00 |
| 330 | 4.00 | | |

TABLE II

*Typical data obtained manually by operator following an anhydrous fusion of sodium benzensulfonate*

[Process temperature is 320° C.]

| Time | Temp. °C. | T-T Units Interval | T-T Units Accrued |
|---|---|---|---|
| a. m. | | | |
| 8:00 | 300 | Start | |
| 8:05 | 304 | .06 | 0.06 |
| 8:10 | 308 | .14 | 0.20 |
| 8:15 | 312 | .25 | 0.45 |
| 8:20 | 316 | .45 | 0.90 |
| 8:25 | 320 | .80 | 1.70 |
| 8:30 | 321 | .95 | 2.65 |
| 8:35 | 320 | 1.10 | 3.75 |
| 8:40 | 319 | .95 | 4.60 |
| 8:45 | 322 | 1.15 | 5.75 |
| 8:50 | 323 | 1.50 | 7.25 |
| 8:55 | 321 | 1.40 | 8.65 |
| 9:00 | 320 | 1.10 | 9.75 |
| 9:05 | 317 | 0.85 | 10.60 |
| 9:10 | 319 | 0.80 | 11.40 |
| 9:15 | 321 | 1.00 | 12.40 |
| 9:20 | 323 | 1.40 | 13.80 |
| 9:25 | 321 | 1.40 | 15.20 |
| 9:30 | 320 | 1.10 | 16.30 |
| 9:35 | 318 | 0.90 | 17.20 |
| 9:40 | 319 | 0.85 | 19.05 |
| 9:45 | 320 | 0.95 | 20.00 |
| 9:50 | 321 | 1.10 | 21.10 |
| 9:55 | 320 | 1.10 | 22.20 |
| 10:00 | 319 | 0.95 | 23.15 |
| 10:05 | 320 | 0.95 | 24.10 |
| 10:10 | 320 | 1.00 | 25.10 |
| 10:15 | 320 | 1.00 | 26.10 |
| 10:20 | 319 | 0.95 | 27.05 |
| 10:25 | 321 | 1.05 | 28.10 |
| 10:30 | 322 | 1.30 | 29.40 |
| 10:35 | 319 | 1.15 | 30.55 |
| 10:40 | 318 | 0.85 | 31.40 |
| 10:45 | 320 | 0.90 | 32.30 |
| 10:50 | 321 | 1.10 | 33.40 |
| 10:55 | 320 | 1.10 | 34.50 |
| 11:00 | 322 | 1.20 | 35.70 |
| 11:05 | 320 | 1.20 | 36.90 |
| 11:10 | 319 | 0.95 | 37.85 |
| 11:15 | 317 | 0.80 | 38.65 |
| 11:20 | 316 | 0.65 | 39.30 |
| 11:25 | 320 | 0.80 | 40.10 |
| 11:30 | 324 | 1.40 | 41.50 |
| 11:35 | 325 | 1.90 | 43.40 |
| 11:40 | 323 | 1.80 | 45.20 |
| 11:45 | 322 | 1.50 | 46.70 |
| 11:50 | 321 | 1.30 | 48.00 |
| 11:55 | 320 | 1.20 | 49.20 |
| 12:00 | 320 | 1.00 | 50.20 |
| 12:05 | 320 | 1.00 | 51.20 |
| 12:10 | 319 | 0.95 | 52.15 |
| 12:15 | 317 | 0.80 | 52.95 |
| 12:20 | 315 | 0.60 | 53.55 |
| 12:25 | 316 | 0.55 | 54.10 |
| 12:30 | 318 | 0.70 | 54.80 |
| 12:35 | 320 | 0.90 | 55.70 |
| 12:40 | 321 | 1.10 | 56.80 |
| 12:45 | 320 | 1.10 | 57.90 |
| 12:50 | 321 | 1.10 | 59.00 |
| 12:55 | 322 | 1.20 | 60.20 |
| 1:00 | 324 | 1.60 | 61.80 |
| 1:05 | 325 | 1.95 | 63.75 |
| 1:10 | 323 | 1.80 | 65.55 |
| 1:15 | 321 | 1.40 | 66.95 |
| 1:20 | 319 | 1.00 | 67.95 |
| 1:25 | 318 | 0.85 | 68.80 |
| 1:30 | 318 | 0.80 | 69.40 |
| 1:35 | 319 | 0.85 | 70.45 |
| 1:40 | 320 | 0.90 | 71.35 |
| 1:45 | 321 | 1.10 | 72.45 |
| 1:50 | 320 | 1.10 | 73.55 |
| 1:55 | 319 | 0.95 | 74.50 |
| 2:00 | 320 | 0.95 | 75.45 |

The fluctuations in temperature shown in Table II are normal fluctuations for laboratory control when heating is by gas fire. Operating without the table, the batch would have been dumped at 2 o'clock as shown. Previous experience has indicated that best operation is obtained with an input of about 60 to 70 T-T units. Operation with the use of Table I and Table II would have lead the operator to dump the batch between 1:30 and 1:35 o'clock. Using table control only, the time at which the batch is dumped varies from batch to batch, but the extent of processing will be identically the same, namely, 69 to 70 units. It so happens in this particular case, that the temperature averaged slightly above normal process temperature of 320° C. In some cases, processing will average slightly under 320° C. However, in the latter case, when processing to 69 to 70 T-T units, the batch would not have been processed to the same extent until possibly about 2:30 o'clock.

All of the work represented by the Table II and the time of one man sitting at the fusion pot to do the work, is automatically and more accurately done by the control covered by this invention. A practical choice of gear ratios and motor speeds simply means that the value of five minutes at 320° C. with the machine is arbitrarily 16 T-T units instead of one. In other words, processing with the instrument requires processing to between 1104 to 1120 T-T units as shown by the counter of the instrument.

TABLE III

*Basis reaction rate doubling every 10° C. rise in temperature*

[Applicable to aqueous (50% or more $H_2O$) pressure fusion of sodium benzene monosulfonate to sodium phenate, where the threshold temperature is 300° C. and a good operating temperature is 320° C.]

| Temp. | T-T Units | Temp. | T-T Units |
|---|---|---|---|
| 300 | 0.25 | 331 | 2.20 |
| 301 | 0.27 | 332 | 2.40 |
| 302 | 0.30 | 333 | 2.60 |
| 303 | 0.32 | 334 | 2.80 |
| 304 | 0.35 | 335 | 3.00 |
| 305 | 0.37 | 336 | 3.20 |
| 306 | 0.39 | 337 | 3.40 |
| 307 | 0.42 | 338 | 3.60 |
| 308 | 0.45 | 339 | 3.80 |
| 309 | 0.48 | 340 | 4.00 |
| 310 | 0.50 | 341 | 4.40 |
| 311 | 0.55 | 342 | 4.80 |
| 312 | 0.60 | 343 | 5.20 |
| 313 | 0.65 | 344 | 5.60 |
| 314 | 0.70 | 345 | 6.00 |
| 315 | 0.75 | 346 | 6.40 |
| 316 | 0.80 | 347 | 6.80 |
| 317 | 0.85 | 348 | 7.20 |
| 318 | 0.90 | 349 | 7.60 |
| 319 | 0.95 | 350 | 8.00 |
| 320 | 1.00 | 351 | 8.80 |
| 321 | 1.10 | 352 | 9.60 |
| 322 | 1.20 | 353 | 10.40 |
| 323 | 1.30 | 354 | 11.20 |
| 324 | 1.40 | 355 | 12.00 |
| 325 | 1.50 | 356 | 12.80 |
| 326 | 1.60 | 357 | 13.60 |
| 327 | 1.70 | 358 | 14.40 |
| 328 | 1.80 | 359 | 15.20 |
| 329 | 1.90 | 360 | 16.00 |
| 330 | 2.00 | | |

TABLE IV.—T-T UNITS

*Basis reaction rate doubling every 10° C. rise in temperature*

[Applicable to anhydrous tolylation of peri acid with paratoluidine where the threshold temperature is 140° C. and a good operating temperature is 155° C.]

| Temp. | T-T Units | Temp. | T-T Units |
|---|---|---|---|
| 140 | 0.37 | 163 | 1.80 |
| 141 | 0.39 | 164 | 1.90 |
| 142 | 0.41 | 165 | 2.00 |
| 143 | 0.45 | 166 | 2.20 |
| 144 | 0.48 | 167 | 2.40 |
| 145 | 0.50 | 168 | 2.60 |
| 146 | 0.55 | 169 | 2.80 |
| 147 | 0.60 | 170 | 3.00 |
| 148 | 0.65 | 171 | 3.20 |
| 149 | 0.70 | 172 | 3.40 |
| 150 | 0.75 | 173 | 3.60 |
| 151 | 0.80 | 174 | 3.80 |
| 152 | 0.85 | 175 | 4.00 |
| 153 | 0.90 | 176 | 4.40 |
| 154 | 0.95 | 177 | 4.80 |
| 155 | 1.00 | 178 | 5.20 |
| 156 | 1.10 | 179 | 5.60 |
| 157 | 1.20 | 180 | 6.00 |
| 158 | 1.30 | 181 | 6.40 |
| 159 | 1.40 | 182 | 6.80 |
| 160 | 1.50 | 183 | 7.20 |
| 161 | 1.60 | 184 | 7.60 |
| 162 | 1.70 | 185 | 8.00 |

Figure 21:
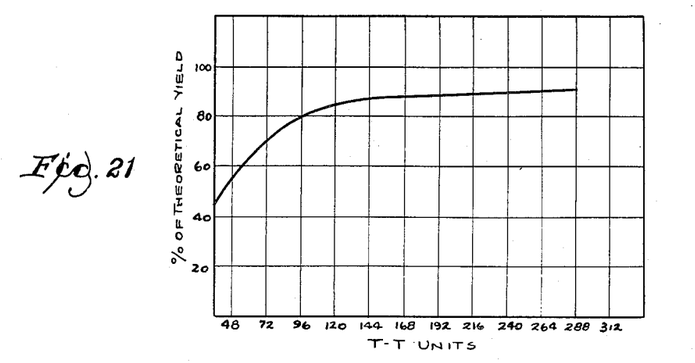
Figs. 21, 22 and 23 are curves showing the yield of various materials and the accrued time temperature readings obtained throughout the processing of such materials.

Fig. 21 shows a graph for the tolylation of peri-acid carried out at the optimum temperature of 155° C. It should be pointed out that only a slight increase in yield was obtained after more than 155 T-T units had been applied to the batch. When operating at about 155° C., the maximum yield obtained was about 85% of the theoretical. In this particular run, a good grade of peri-acid, analyzing about 92% strength, was utilized.

Figure 22:
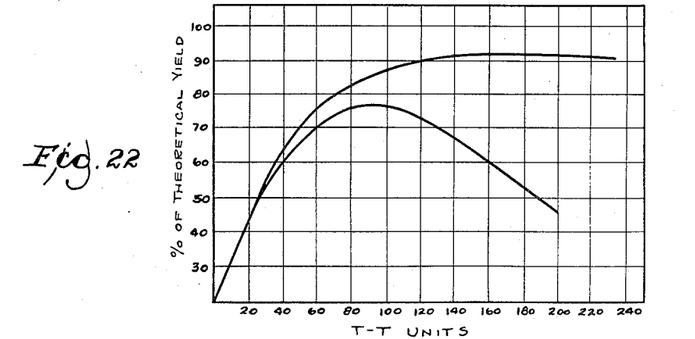

In Fig. 22 two similar curves are shown for the aqueous fusion of sodium benzene mono-sulfonate to produce sodium phenate with caustic soda. The upper curve represents work carried out in a nickel-lined autoclave and the lower curve represents work carried out in an autoclave lined with mild carbon steel. Although the temperature was held at about 320° C. as carefully as possible, the temperature fluctuated between about 316° C. and 360° C. The results from the work in the steel lined autoclave, indicate that by-products were continuously formed and that the yields obtained were not as high as those obtained in the nickel lined autoclave.

Figure 23:
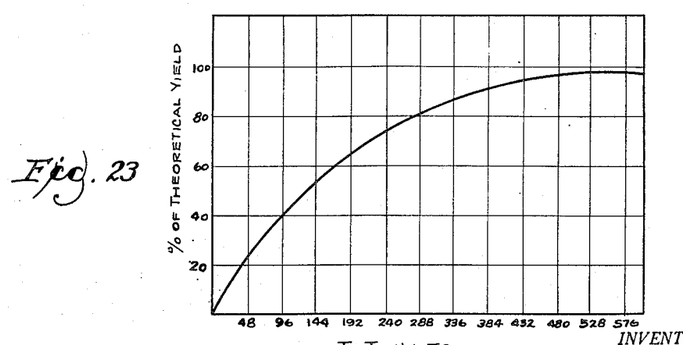

Figure 23 is a curve which shows the progressive increase of yield of phenyl acid in the mono-phenylation of peri-acid against input of T-T units. In this case, the materials were put into the autoclave and the temperature raised to 150° C. and held there as closely as possible. In this case, five minutes at 150° C. had a T-T value of 1.00. A chart was made similar to Table I, and from time to time samples were withdrawn and yield of phenyl acid determined. Actually the temperature fluctuated between about 146° C. and 153° C., but the correction for the varying temperature is such that a very smooth curve is obtained when plotting yield against T-T units. This represents an application of the invention when applied to a laboratory research problem. The chart made similar to Table I for the curve of Fig. 23 showed T-T units identical with what would be shown by the counter of the control instrument covered by this invention, except that at all times the counter reading would be sixteen times the value of the manually-obtained figure and that the figure may be other than 16 for T-T instruments having motor speeds and gear ratios differing from the example described.

This application is a continuation of my prior applications Serial No. 120,380, filed October 8, 1949, and Serial No. 136,128, filed December 30, 1949, now abandoned.

I claim:

1. In apparatus for controlling chemical reactions accompanied by temperature varying with variation in the rate of reaction, the combination of thermo-responsvie means for continuously responding to the temperature in the reaction and having a portion moving responsive to the temperature changes to successive positions corresponding to steps of the same number of degrees change in temperature, a source of rotation at substantially constant speed, a plurality of speed-changing mechanisms electrically activated dependent on positioning of the moving portion of said thermo-responsive means and operable at speeds proportional to the integral of the varying reaction rate and varying temperature, switches at the different positions for the moving portion of said thermo-responsive means and actuated thereby and for individually initiating operation of the speed-changing mechanism to be operated at the step of temperature then existing in the reaction, a counter operated by and for totaling the number of operations of all of the speed-changing mechanisms, and means for interrupting operation of a speed-changing mechanism upon starting operation of the next speed-changing mechanism at another temperature step.

2. In apparatus for controlling chemical reactions responsive to a temperature varying with variation in the rate of reaction and corresponding reaction time, the combination of thermo-responsive means for continuously responding to the temperature in the reaction and moving responsive to temperature changes to successive positions corresponding to steps of the same number of degrees change in temperature, a power device operating at substantially constant speed, a plurality of gear trains of different gear ratios corresponding to different temperature steps of the reaction, the gear trains delivering power to a common final shaft clutches severally associated with the gear trains for connecting and disconnecting the gear trains and the final shaft thereof, means selectively activated by the thermo-responsive means dependent on movement thereof into one of a plurality of positions for individually engaging the clutches at different times, means severally connected with the clutch operating means for severally signalling engagement of the clutches, a counter connected with the common shaft the gear trains for totaling the number of revolutions of the common shaft, and means for automatically de-activating a clutch engaging means and a signalling means upon movement of the thermo-responsive means into another position.

3. In apparatus for controlling chemical reactions proceeding at a temperature varying with variation in the rate of reaction, the combination of thermo-responsive means for continuously responding to the temperature in the reaction and moving responsive to temperature changes to successive positions differing by steps of the same number of degrees change in temperature, a power driven device operating at substantially constant speed, a plurality of gear trains of speed change ratios differing by amounts proportional to doubling of the rate of the reaction, a common output shaft for the gear trains, plural electrically energized means for individually connecting the gear trains with the output shaft, a plurality of switches selectively actuated by the thermo-responsive means at different steps of reaction temperature for successively controlling energization of said gear trains and shaft connecting means, a counter actuated by the shaft for totaling the number of revolutions of the final gear in all gear trains, and means for de-energizing said electrical means and said switches upon movement from one step to another step of said thermo-responsive means.

References Cited in the file of this patent

UNITED STATES PATENTS

| | | |
|---|---|---|
| 774,910 | Crawford | Nov. 15, 1904 |
| 1,303,989 | Suren | May 20, 1919 |
| 1,338,715 | Welch | May 4, 1920 |
| 2,320,310 | Stoddard et al. | May 25, 1943 |
| 2,505,521 | Boyajian | Apr. 25, 1950 |